(12) United States Patent
Hegde et al.

(10) Patent No.: US 10,379,942 B2
(45) Date of Patent: Aug. 13, 2019

(54) EFFICIENT TRANSFER OF OBJECTS BETWEEN CONTAINERS ON THE SAME VAULT

(71) Applicant: International Business Machines Corporation, Armonk, NY (US)

(72) Inventors: Harsha Hegde, Hawthorn Woods, IL (US); Lakshmi Krishna Priya Kala, Hyderabad (IN); Wesley B. Leggette, Chicago, IL (US); Manish Motwani, Chicago, IL (US); Jason K. Resch, Chicago, IL (US); Daniel J. Scholl, Chicago, IL (US); Rohan P. Shah, Chicago, IL (US); Yogesh R. Vedpathak, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 122 days.

(21) Appl. No.: 15/717,626

(22) Filed: Sep. 27, 2017

(65) Prior Publication Data
US 2019/0095277 A1 Mar. 28, 2019

(51) Int. Cl.
*G06F 11/10* (2006.01)
*G06F 3/06* (2006.01)

(52) U.S. Cl.
CPC ......... *G06F 11/1044* (2013.01); *G06F 3/067* (2013.01); *G06F 3/0608* (2013.01);
(Continued)

(58) Field of Classification Search
CPC ............. G06F 11/1044; G06F 11/1076; G06F 3/0641; G06F 2201/805; G06F 3/0604;
(Continued)

(56) References Cited

U.S. PATENT DOCUMENTS 4,092,732 A 5/1978 Ouchi
5,454,101 A 9/1995 Mackay et al.
(Continued)

OTHER PUBLICATIONS

Shamir; How to Share a Secret; Communications of the ACM; vol. 22, No. 11; Nov. 1979; pp. 612-613.
(Continued)

*Primary Examiner* — Cynthia Britt
(74) *Attorney, Agent, or Firm* — Garlick & Markison; Timothy W. Markison; Patricia A. Markison

(57) ABSTRACT

A method includes determining to transfer a data object from a first container of a vault to a second container of the vault. The method further includes determining first and second storage parameters for the first and second containers, respectively. When the first storage parameters substantially match the second storage parameters, the method further includes retrieving metadata of the data object from a first container structure associated with the first container. The method further includes modifying the metadata regarding the transferring of the data object from the first container to the second container to produce modified metadata. The method further includes adding the modified metadata to a second container structure associated with the second container such that the data object is accessible via the second container.

16 Claims, 9 Drawing Sheets

(52) U.S. Cl.
CPC .......... *G06F 3/0619* (2013.01); *G06F 3/0641* (2013.01); *G06F 3/0647* (2013.01)

(58) Field of Classification Search
CPC ............... G06F 3/0608; G06F 11/2094; G06F 2212/263; G06F 3/0647; G06F 17/30575; G06F 17/3053; G06F 17/30578; G06F 17/30545; G06F 17/30312; G06F 3/065; G06F 11/1662; G06F 3/067; G06F 3/0619; G06F 3/064; H04L 65/4076; H04L 67/16; H04L 67/1095; H04L 67/06; H04L 67/1097; H03M 13/1515; H03M 13/3761; H03M 13/33; Y10S 707/9994
See application file for complete search history.

(56) References Cited

U.S. PATENT DOCUMENTS

| | | | |
|---|---|---|---|
| 5,485,474 | A | 1/1996 | Rabin |
| 5,774,643 | A | 6/1998 | Lubbers et al. |
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,678,700 | B1 * | 1/2004 | Moore ................. G06F 16/256 |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,636,724 | B2 | 12/2009 | de la Torre et al. |
| 8,230,191 | B2 * | 7/2012 | Noguchi ............... G06F 3/0608 707/999.205 |
| 8,725,684 | B1 * | 5/2014 | Wang ..................... G06F 16/275 707/613 |
| 9,411,685 | B2 * | 8/2016 | Lee ..................... G06F 11/1076 |
| 9,684,558 | B2 * | 6/2017 | Grube ................ G06F 11/1076 |
| 9,875,043 | B1 * | 1/2018 | Suldhal ................. G06F 3/0619 |
| 10,209,903 | B2 * | 2/2019 | Grube ..................... G06F 11/10 |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma et al. |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula, Jr. |
| 2005/0132070 | A1 | 6/2005 | Redlich et al. |
| 2005/0144382 | A1 | 6/2005 | Schmisseur |
| 2005/0229069 | A1 | 10/2005 | Hassner |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll, Jr. |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters, III et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |
| 2011/0314355 | A1 * | 12/2011 | Grube ................. G06F 11/1076 714/763 |
| 2012/0137091 | A1 * | 5/2012 | Grube ................. G06F 12/0638 711/158 |
| 2013/0305060 | A9 * | 11/2013 | Resch ..................... H04L 12/00 713/193 |
| 2014/0040417 | A1 * | 2/2014 | Gladwin ............. G06F 11/2053 709/214 |
| 2017/0004195 | A1 * | 1/2017 | Ciborowski ........ G06F 11/1076 |
| 2017/0075585 | A1 * | 3/2017 | Baptist .................. G06F 3/0605 |
| 2017/0093753 | A1 * | 3/2017 | Summers ................ H04L 47/72 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

(56) References Cited

OTHER PUBLICATIONS

Zeilenga; Lightweight Directory Access Protocol (LDAP): Technical Specification Road Map; IETF Network Working Group; RFC 4510; Jun. 2006; pp. 1-8.
Zeilenga; Lightweight Directory Access Protocol (LDAP): String Representation of Distinguished Names; IETF Network Working Group; RFC 4514; Jun. 2006; pp. 1-15.
Sermersheim; Lightweight Directory Access Protocol (LDAP): The Protocol; IETF Network Working Group; RFC 4511; Jun. 2006; pp. 1-68.
Satran, et al.; Internet Small Computer Systems Interface (iSCSI); IETF Network Working Group; RFC 3720; Apr. 2004; pp. 1-257.
Xin, et al.; Evaluation of Distributed Recovery in Large-Scale Storage Systems; 13th IEEE International Symposium on High Performance Distributed Computing; Jun. 2004; pp. 172-181.
Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

\* cited by examiner

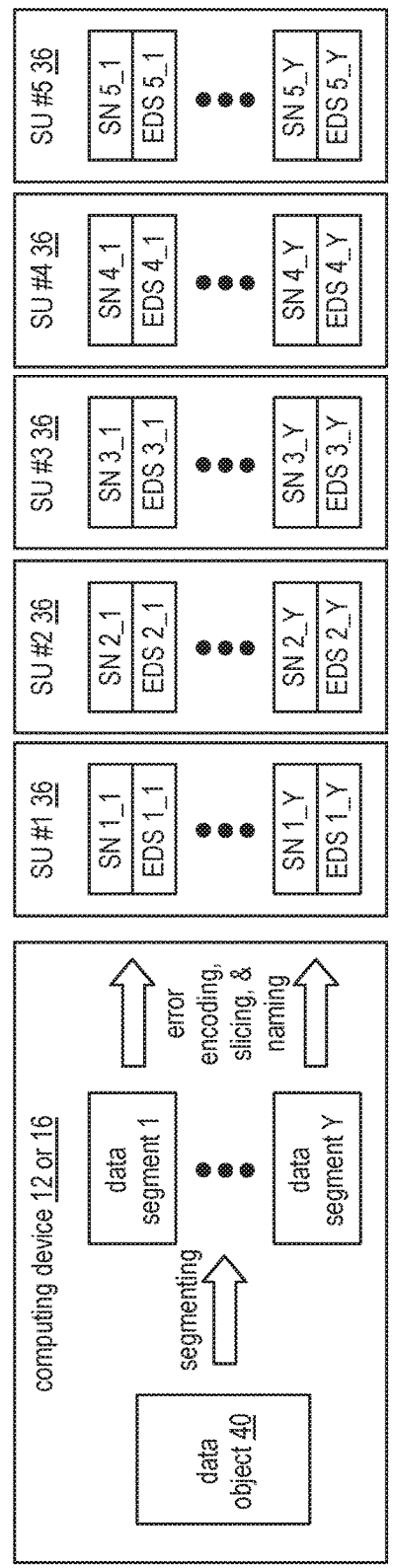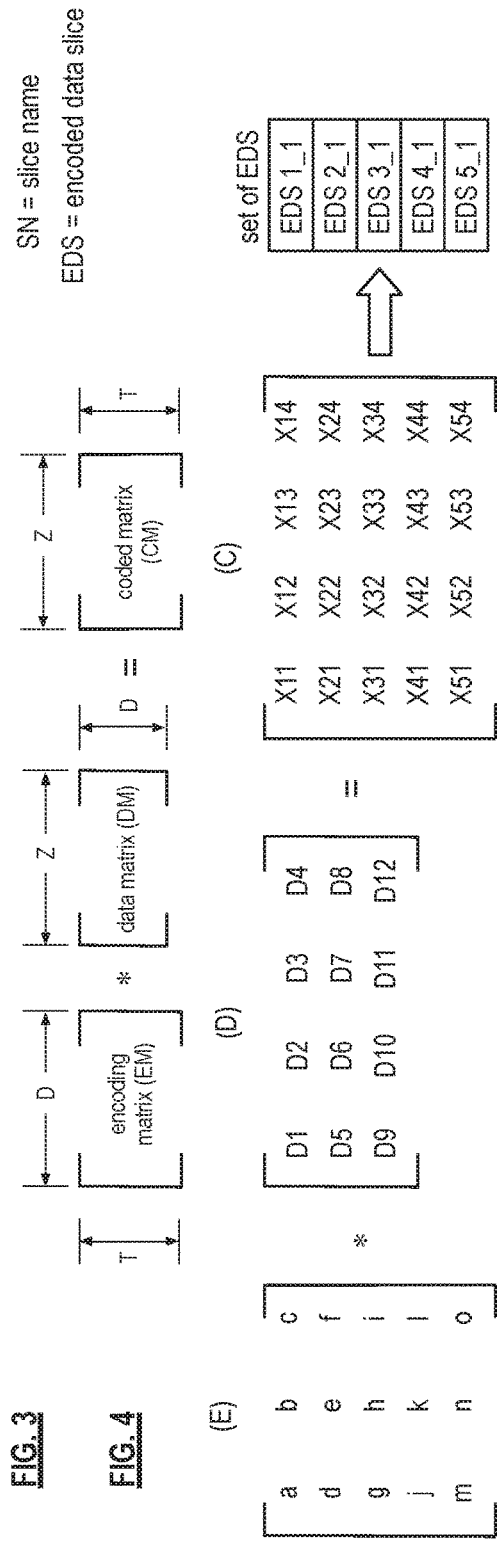

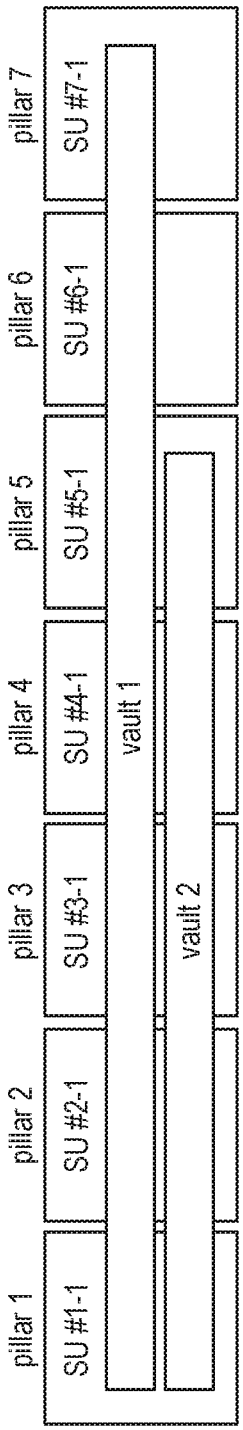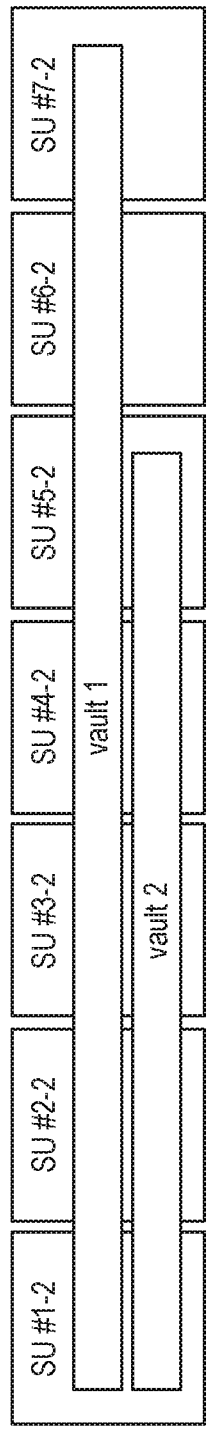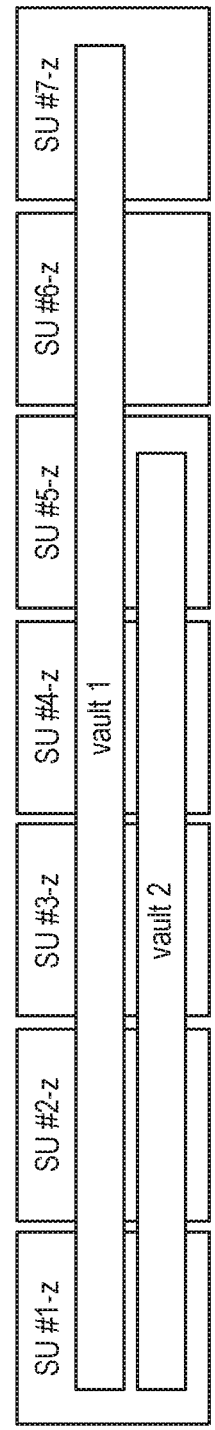
FIG. 9

EFFICIENT TRANSFER OF OBJECTS BETWEEN CONTAINERS ON THE SAME VAULT

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage. As is further known, data can be separated into distinct logical groupings within a dispersed storage system. Copying and pasting or moving data within various groupings can expend time and resources.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 9 is a schematic block diagram of an example of a plurality of sets of storage units supporting a plurality of vaults in accordance with the present invention;

DETAILED DESCRIPTION OF THE INVENTION

Figure 1:
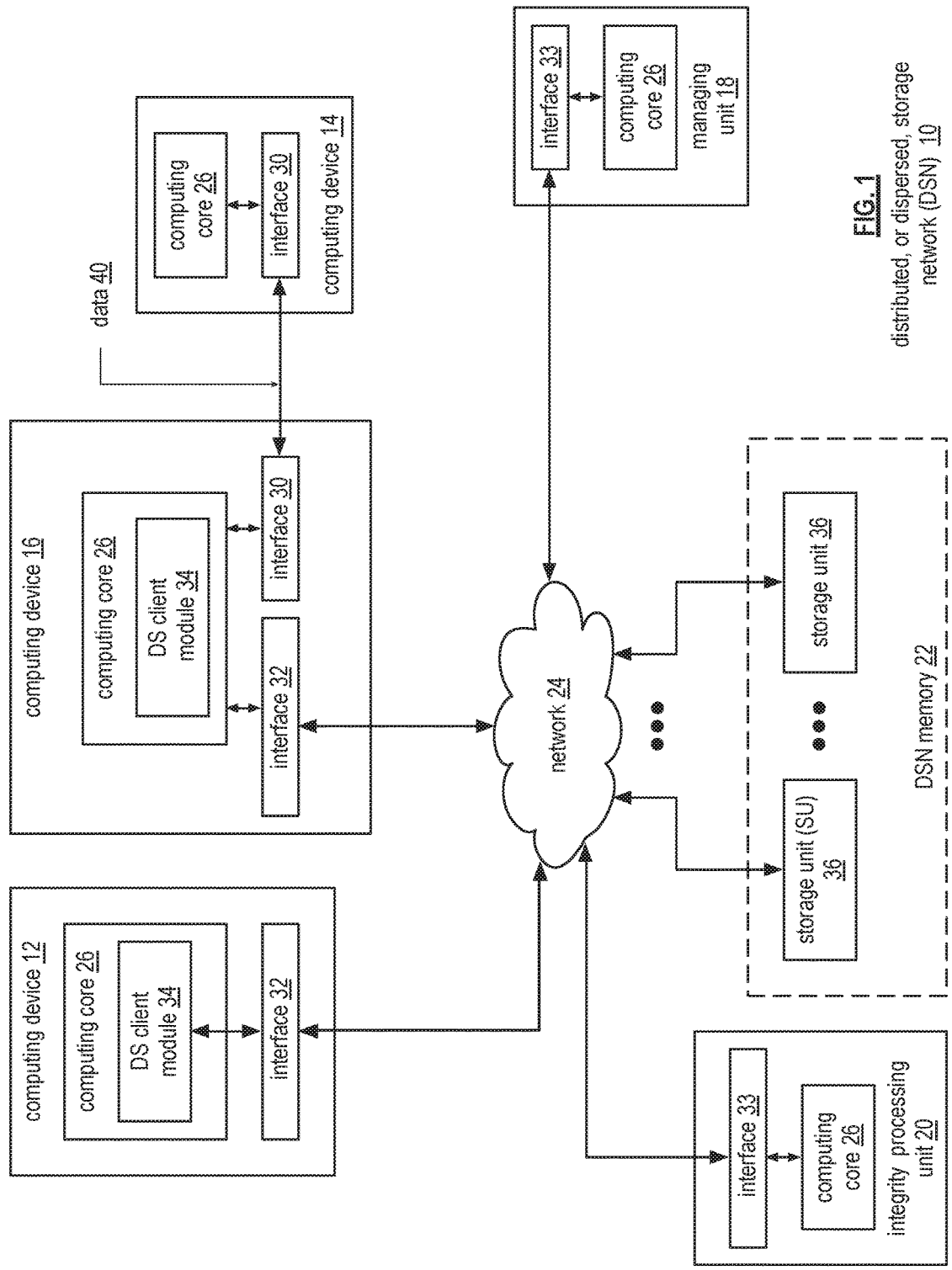
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
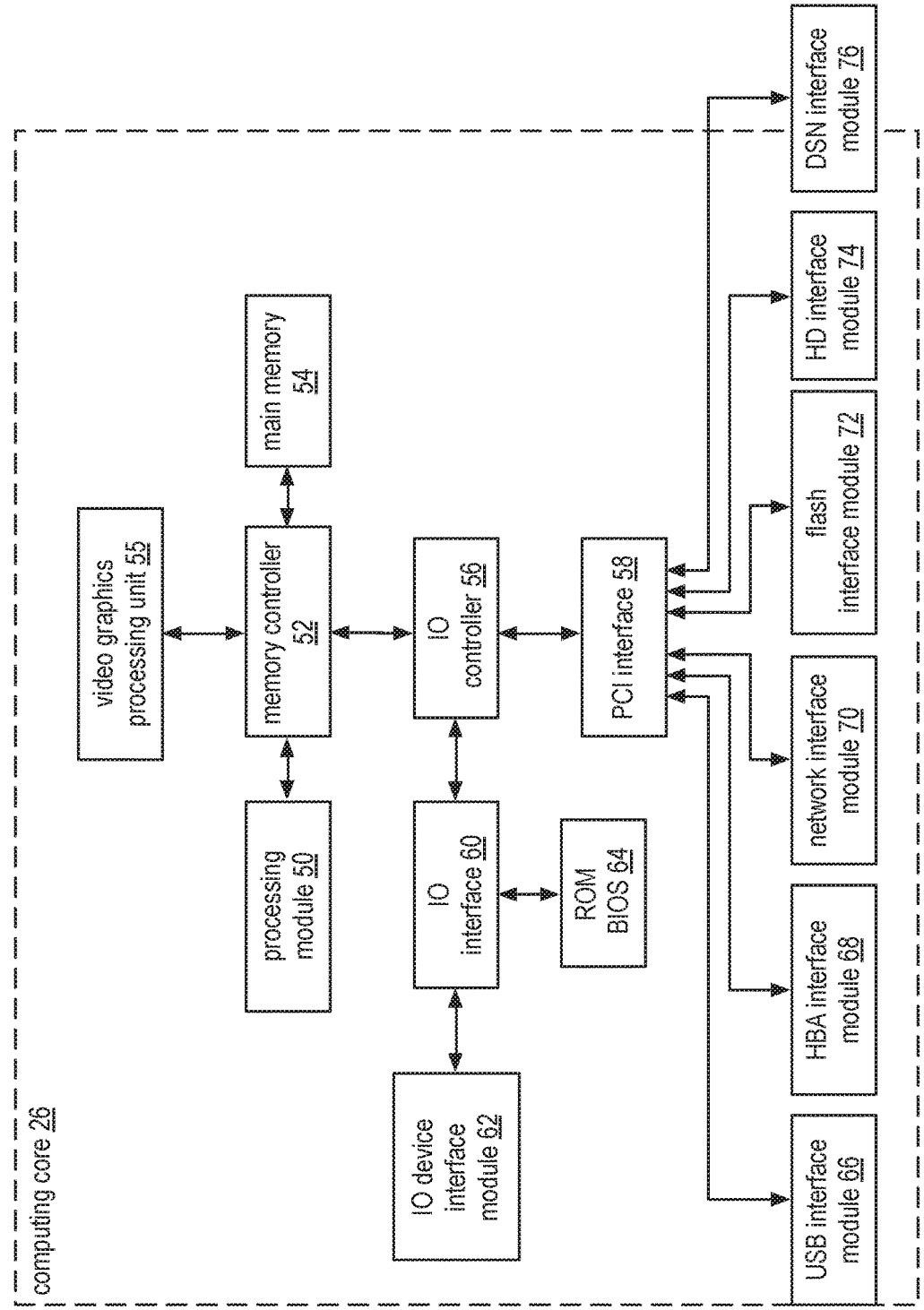
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSTN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSTN managing unit 18 tracks the number of times a user accesses a non-public vault and/or public vaults, which can be used to generate a per-access billing information. In another instance, the DSTN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSTN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12).

The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
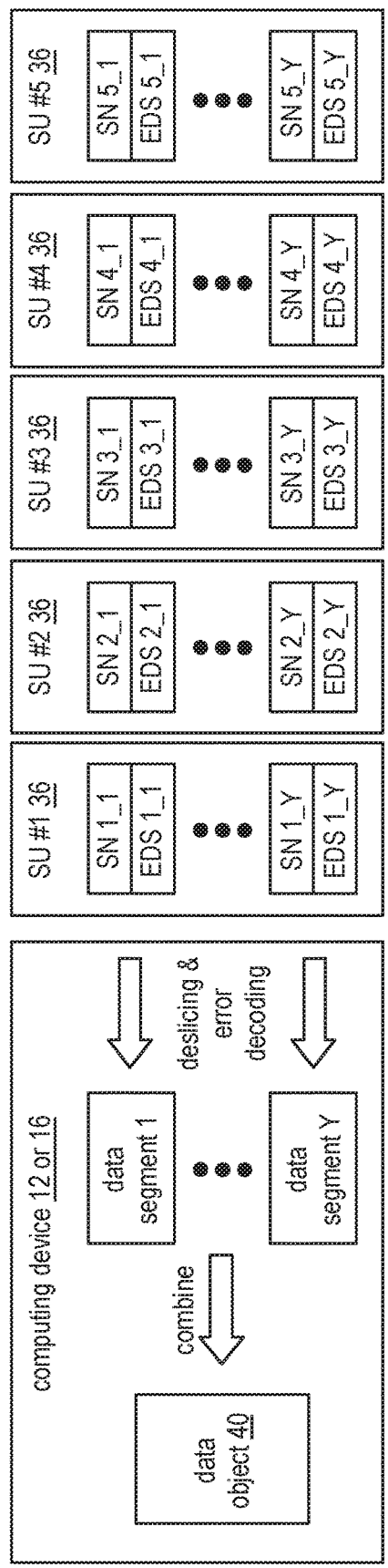
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
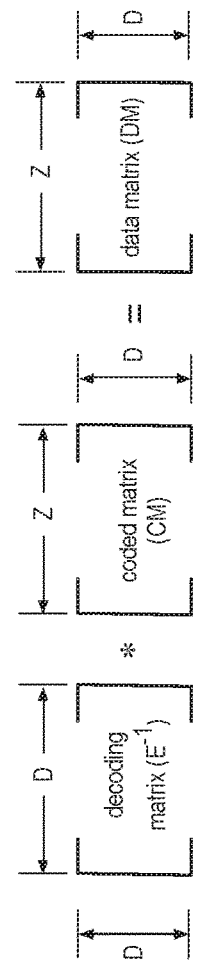
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

FIG. 9 is a schematic block diagram of an example of a plurality of sets of storage units supporting a plurality of vaults. FIG. 9 includes a plurality of storage units arranged into a plurality of sets of storage units. In this example, each set of storage units includes seven storage units for ease of illustration. For instance, storage unit set #1 includes SU #1-1 through SU#7-1. A set, however, can have many more storage units than seven and, from set to set, may have different numbers of storage units.

The sets of storage units support two vaults (vault 1 and vault 2). A vault is a virtual memory space that maps to a set of storage units and is affiliated with a user computing device. The number of storage units within a set supporting a vault corresponds to the pillar width number. As shown, a set has rows of storage units, where SU #1-1 through SU #1-z represent a plurality of storage units, each corresponding to a first pillar number; SU #2-1 through SU#2-z represent a second plurality of storage units, each corresponding to a second pillar number; and so on.

The sets of storage units support vault 1 with all seven storage units of each set providing vault 1 with a pillar width number of seven. Other vaults may use a pillar width number of seven or less than a pillar width number of seven storage units. For example, the sets of storage units also support vault 2 with five out of the seven total storage units of each set providing vault 2 with a pillar number of five. The pillar width number is a per data segment encoding value of the dispersed storage error encoding parameters.

Figure 10:
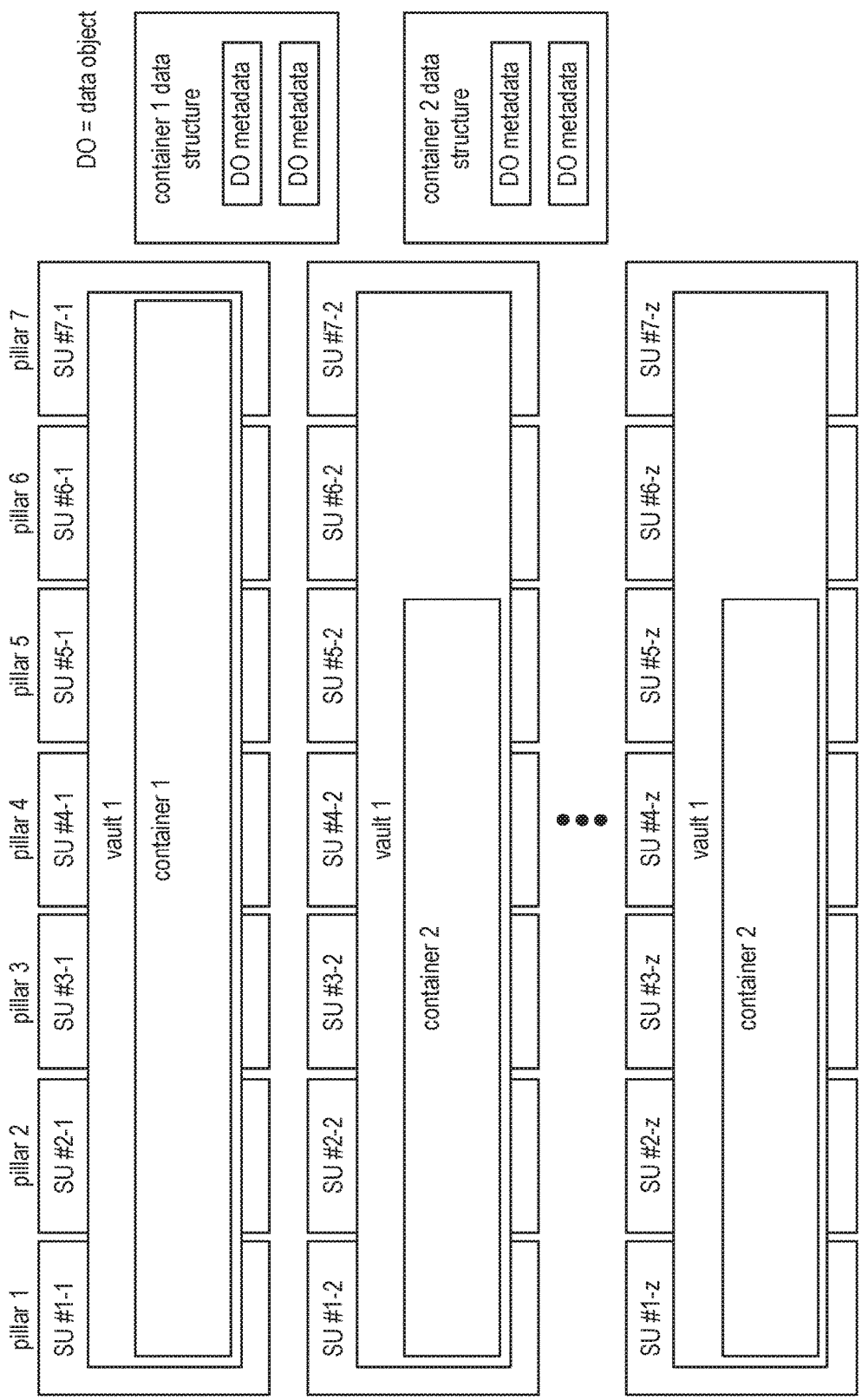
FIG. 10 is a schematic block diagram of an example of a plurality of sets of storage units supporting a plurality of containers in accordance with the present invention.

FIG. 10 is a schematic block diagram of an example of a plurality of sets of storage units supporting a plurality of containers. FIG. 10 includes the plurality of sets of storage units supporting vault 1 of FIG. 9. As shown, vault 1 further supports container 1 and container 2. Containers are an abstraction for separating data into distinct logical groupings, even when that data may all be stored within the same vault. Containers may span all vertical storage units of the storage unit sets, just one horizontal storage unit set, or some plurality of storage units in between.

As an example, container 1, supported by vault 1, spans one horizontal set of storage units (SU#1-1 through SU #7-1). Containers supported by the same vault can have the same or different pillar widths. For example, container 2, also supported by vault 1, spans vertical storage units of the storage unit sets SU #1-2 through SU #1-z, SU #2-2 through SU #2-z, SU #3-2 through SU #3-z, SU #4-2 through SU #4-z, and SU #5-2 through SU #5-z. Because container 2 spans five out of the seven storage units within a storage unit set, it has a pillar width of five while container 1 (spanning all seven storage units of one horizontal set of storage units) has a pillar width of seven.

Each container has its own data structure (container 1 data structure and container 2 data structure) to identify which sources (e.g., data objects (DO)) exist and belong within one container versus another. The container data structures are dispersed structures (e.g., a data link connection identifier (DLCI)) stored as a set of error encoded data slices in one or more rows of a set of storage units. To identify which data objects belong within one container versus another, the container data structures store data object metadata (e.g., DO metadata) corresponding to the data objects stored in its respective container.

Figure 11A:
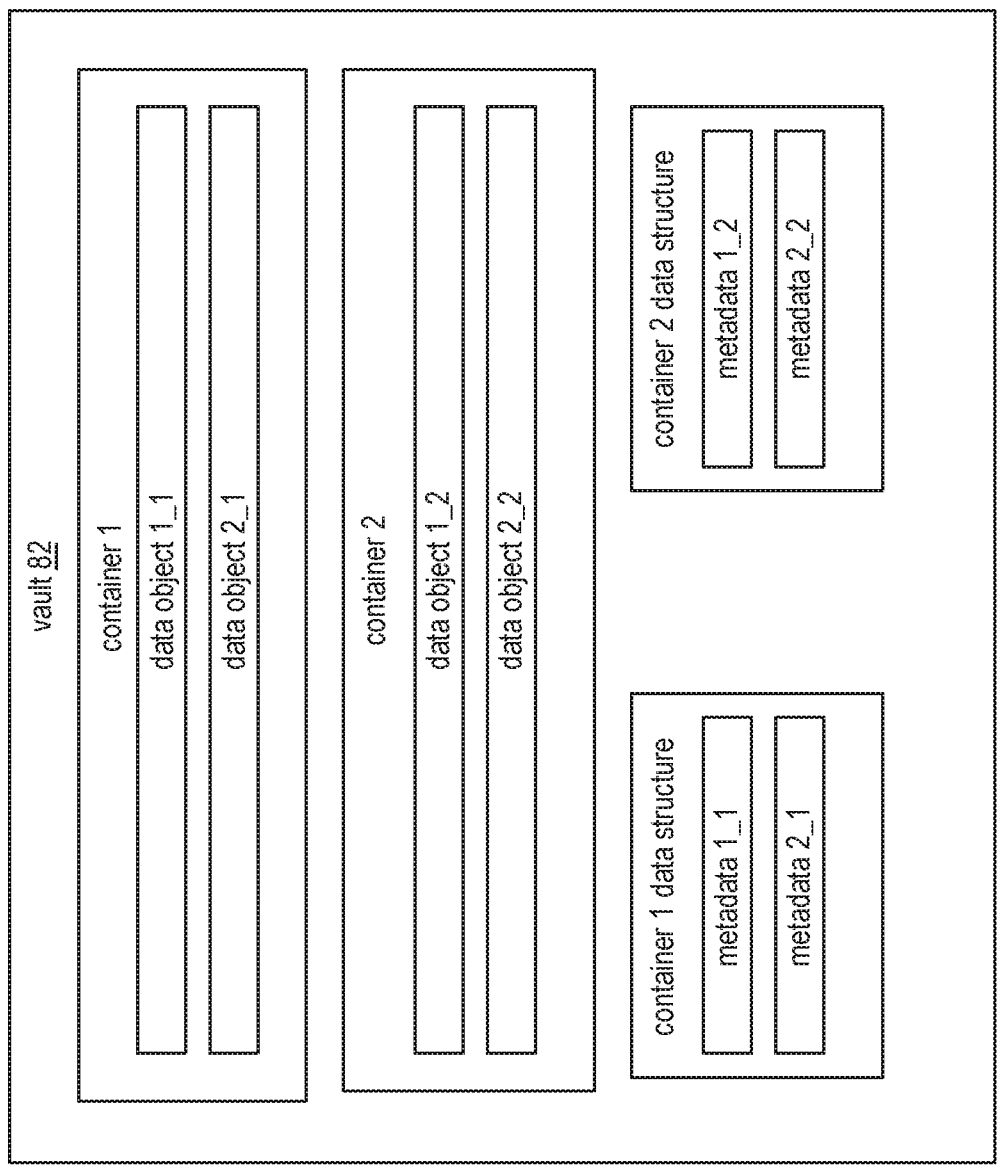
FIGS. 11A and 11B are schematic block diagrams of an example of transferring a data object between containers within a vault of a dispersed storage network in accordance with the present invention.
Figure 11B:
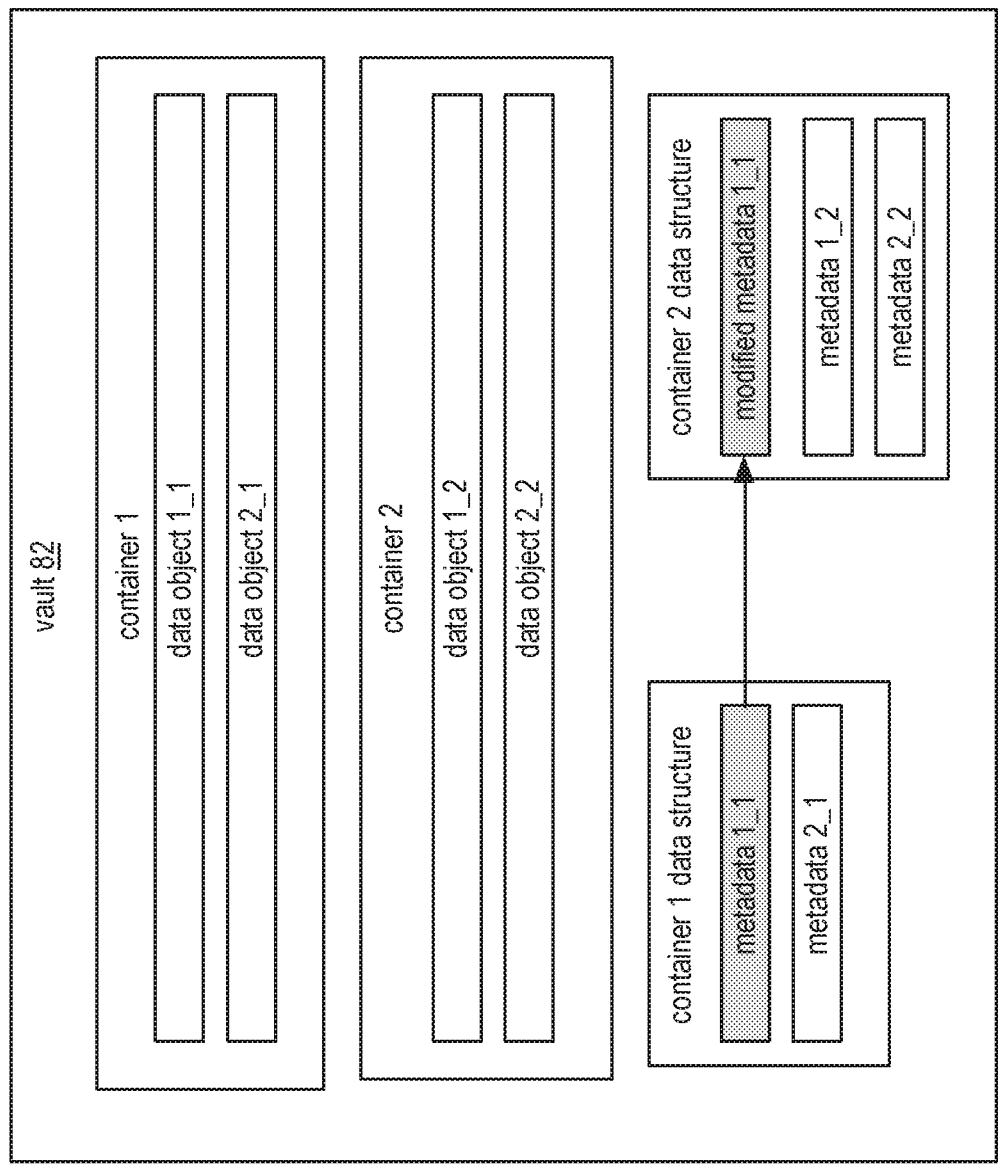

FIGS. 11A and 11B are schematic block diagrams of an example of transferring a data object between containers within a vault of a dispersed storage network (DSN). Vaults are logical memory structures supported by physical memory of storage units of the DSN and may be further logically divided into a plurality of logical containers. FIGS. 11A and 11B include vault 82 that is divided into container 1 and container 2. Containers are a further abstraction for separating data into distinct logical groupings even though the data is stored within the same logical vault. For example, vault 82 is associated with data objects 1_1 through 2_2 while container 1 stores data object 1_1 and data object 2_1 and container 2 stores data object 1_2 and data object 2_2. The data objects are each dispersed error encoded and stored in a respective container as a plurality of sets of encoded data slices. Each container is associated with a dispersed data structure (e.g., a data link connection identifier (DLCI)), stored as a set of error encoded data slices in one or more rows of a set of storage units, to identify which data objects are associated with which container.

As an example, container 1 is associated with container 1 data structure and container 2 is associated with container 2 data structure. The container data structures store metadata associated with the data object stored in its associated container. Data object metadata includes one or more of permissions for the data object, DSN addresses of the plurality of sets of encoded data slices, and access control to the data object. Container 1 structure stores metadata 1_1 and metadata 1_2 to define and identify data object 1_1 and data object 1_2 respectively. Container 2 structure stores metadata 2_1 and metadata 2_2 to define and identify data object 2_1 and data object 2_2 respectively.

When a data object is to be transferred (e.g., migrated, duplicated, etc.) between containers within the same vault it is not necessary to transfer the underlying data object to the new container if the containers share substantially the same storage parameters. Storage parameters include pillar number, decode threshold number, and encoding function. Referring to the example shown in FIG. 11B, vault 82 receives a request to transfer data object 1_1 from container 1 to container 2. In response to this request, the container 1's storage parameters and container 2's storage parameters are determined and compared. When container 1's storage parameters and container 2's storage parameters substantially match, the container data structures' metadata is updated corresponding to the particular transfer but the underlying data is not transferred. Container 1's storage parameters substantially match container 2's storage parameters when container 1's pillar number substantially matches container 2's pillar number, container 1's decode threshold number substantially matches container 2's decode threshold number, and container 1's encoding function substantially matches container 2's encoding function.

If container 1's storage parameters substantially match container 2's storage parameters, metadata 1_1 is retrieved from container 1 data structure. Metadata 1_1 is modified regarding the transfer of data object 1_1 from container 1 to container 2 to produce modified metadata 1_1. For example, modified metadata 1_1 indicates that data object 1_1 is now located in container 2. The modified metadata 1_1 is added to container 2 data structure such that data object 1_1 is accessible via container 2. When the transfer is a migration, metadata 1_1 is deleted from container 1 data structure after the modified metadata 1_1 is added to container 2 data structure. When the transfer is a duplication, container 1 data structure retains metadata 1_1 so that data object 1_1 is accessible via container 1 and container 2.

If container 1's storage parameters do not substantially match container 2's storage parameters, the difference in storage parameters is assessed. If container 1's encoding function does not substantially match container 2's encoding function, a more traditional data transfer occurs. The plurality of sets of encoded data slices of data object 1_1 are retrieved from container 1 and decoded with container 1's decoding function to retrieve data object 1_1. Data object 1_1 is then encoded with container 2's storage parameters to produce a new plurality of sets of encoded data slices of data object 1_1. The new plurality of sets of encoded data slices of data object 1_1 are stored in container 2. Removing the data from container 1 and storing it in container 2 updates container 1 and 2's individual data structures accordingly.

When container 1's decode threshold number does not substantially match container 2's decode threshold, the plurality of sets of encoded data slices of data object 1_1 are retrieved from container 1 and decoded with container 1's decoding function to retrieve data object 1_1. Data object 1_1 is then encoded with container 2's storage parameters to produce a new plurality of sets of encoded data slices of data object 1_1. The new plurality of sets of encoded data slices of data object 1_1 are stored in container 2. Removing the data from container 1 and storing it in container 2 updates container 1 and 2's individual data structures accordingly.

When the only difference in container 1's storage parameters and container 2's storage parameters is that container 1's pillar number is greater than container 2's pillar number, metadata 1_1 is modified to include the DSN addresses for a plurality of modified sets of encoded data slices of the plurality of sets of encoded data slices of data object 1_1. A modified set of encoded data slices of the plurality of modified sets of encoded data slices includes container 2's pillar number. For example, in FIG. 10, container 1 has a pillar number of seven and container 2 has a pillar number of five. If this is the only difference in storage parameters, a data object can be transferred from container 1 to container 2 by modifying metadata 1_1 to include the DSN addresses for a plurality of modified sets of encoded data slices of the plurality of sets of encoded data slices of data object 1_1 where the modified set of encoded data slices of the plurality of modified sets of encoded data slices includes container 2's pillar number (five).

When the only difference in container 1's storage parameters and container 2's storage parameters is that container 1's pillar number is less than container 2's pillar number, one or more new encoded data slices for each set of the plurality of sets of encoded data slices of data object 1_1 are generated using container 1's encoding function. Metadata 1_1 is modified to include DSN addresses for the plurality of sets of encoded data slices of data object 1_1 and the one or more new encoded data slices for each set of the plurality of sets of encoded data slices of data object 1_1. After the pillar number is adjusted by either method described above, the metadata is then added to the container data structure of the destination container.

Figure 12:
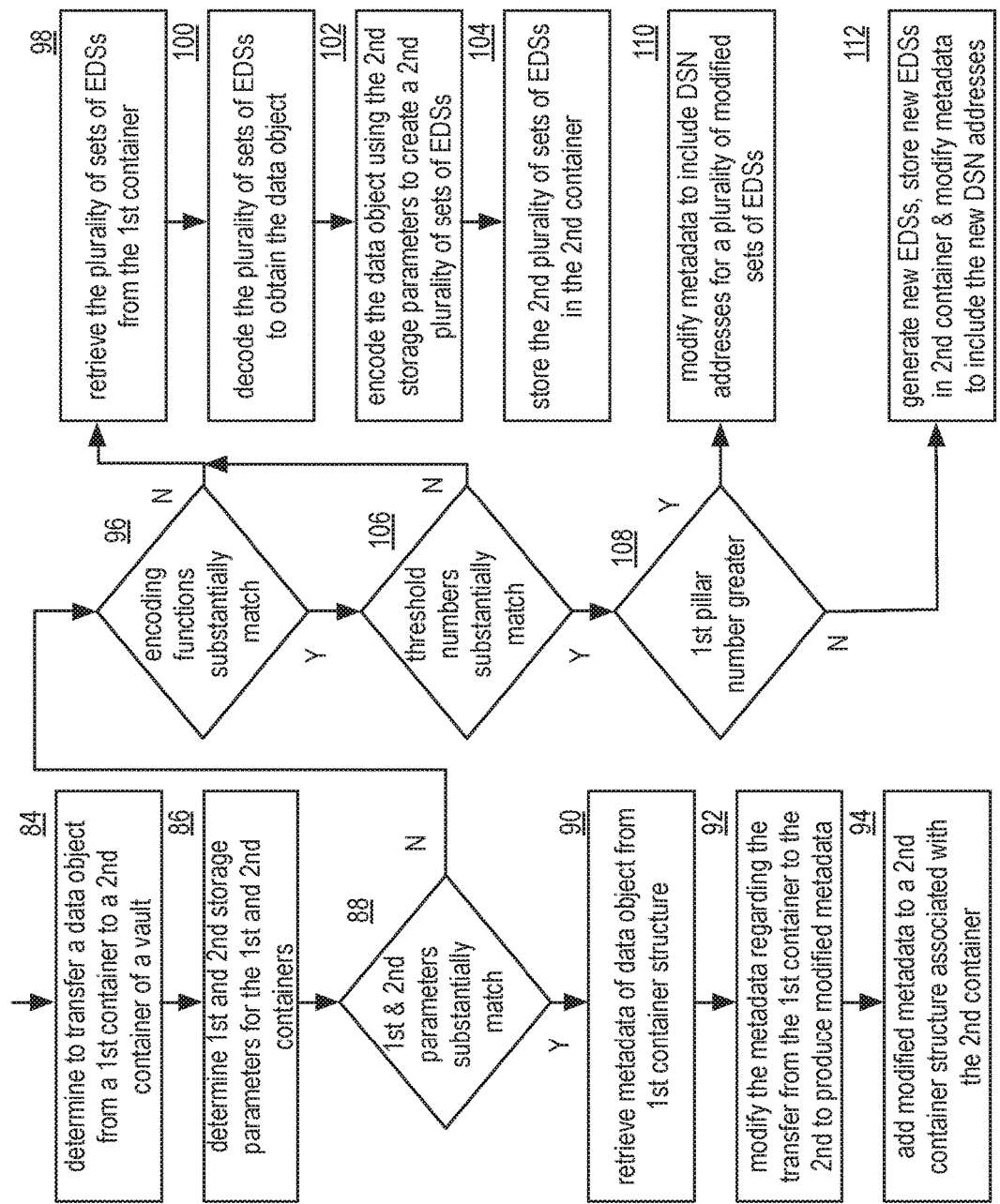
FIG. 12 is a logic diagram of an example of a method of transferring a data object between containers within a vault of a dispersed storage network in accordance with the present invention.

FIG. 12 is a logic diagram of an example of a method of transferring a data object between containers within a vault of a dispersed storage network (DSN). The method begins with step 84 where a computing device of the DSN determines to transfer (e.g., migrate, duplicate, etc.) a data object from a first container to a second container within the same vault. A vault is a logical memory structure supported by physical memory of storage units of the DSN and is logically divided into a plurality of containers that includes the first and second containers. The data object is stored in the first container as a plurality of sets of encoded data slices.

The method continues with step 86 where the computing device determines first and second storage parameters for the first and second containers, respectively. The first storage parameters include a first pillar number, a first decode threshold number, and a first encoding function. The second storage parameters include a second pillar number, a second decode threshold number, and a second encoding function.

The method continues with step 88 where the computing device determines whether the first storage parameters substantially match the second storage parameters. The first storage parameters substantially match the second storage parameters when the first pillar number substantially the second pillar number, the first decode threshold number substantially matches the second decode threshold number, and the first encoding function substantially matches the second encoding function.

When the first storage parameters substantially match the second storage parameters, the method continues with step 90 where the computing device retrieves metadata of the data object from a first container structure associated with the first container. The metadata includes one or more of permissions for the data object, DSN addresses of the plurality of sets of encoded data slices, and access control to the data object. The method continues with step 92 where the computing device modifies the metadata regarding the transferring of the data object from the first container to the second container to produce modified metadata. The method continues with step 94 where the modified metadata is added to a second container structure associated with the second container such that the data object is accessible via the second container. When the transfer is a migration, the metadata of the data object is deleted from the first container structure after the modified metadata is added to the second container structure. When the transfer is duplication the metadata of the data object is retained in the first container structure after the modified metadata is added to the second container structure.

When the first storage parameters do not substantially match the second storage parameters, the method continues with step 96 where the computing device determines whether the first encoding function substantially matches the second encoding function. When the first encoding function does not substantially match the second encoding function, the method continues with step 98 where the computing device retrieves the plurality of sets of encoded data slices from the first container. The method continues with step 100 where the computing device decodes the plurality of sets of encoded data slices to obtain the data object. The method continues with step 102 where the computing device encodes the data object using the second storage parameters to produce a second plurality of sets of encoded data slices. The method continues with step 104 where the computing device stores the second plurality of sets of encoded data slices in the second container.

When the first encoding function does substantially match the second encoding function, the method continues with step 106 where computing device determines whether the first decode threshold number substantially matches the second decode threshold number. When the first decode threshold number does not substantially match the second decode threshold number, the method continues with steps 98-104. When the first decode threshold number does substantially match the second decode threshold number, the method continues with step 108 where the computing device determines whether the first pillar number is greater than the second pillar number.

When the first pillar number is greater than the second pillar number, the method continues with step 110 where the computing device modifies the metadata to include DSN addresses for a plurality of modified sets of encoded data slices of the plurality of sets of encoded data slices, where a modified set of encoded data slices of the plurality of modified sets of encoded data slices includes the second pillar number of encoded data slices. When the first pillar number is not greater than the second pillar number, the method continues with step 112 where the computing device generates one or more new encoded data slices for each set of the plurality of sets of encoded data slices based on the first encoding function. The one or more new encoded data slices for each set of the plurality of sets of encoded data slices are stored in the second container, and the metadata is modified to include DSN addresses for the plurality of sets of encoded data slices and for the one or more new encoded data slices for each set of the plurality of sets of encoded data slices.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a computing device of a dispersed storage network (DSN), the method comprises:

determining to transfer a data object from a first container of a vault to a second container of the vault, wherein a vault is a logical memory structure supported by physical memory of storage units of the DSN, wherein the vault is logically divided into a plurality of containers that includes the first and second containers, wherein the data object is stored in the first container as a plurality of sets of encoded data slices;

determining first and second storage parameters for the first and second containers, respectively, wherein the first storage parameters include a first pillar number, a first decode threshold number, and a first encoding function and the second storage parameters include a second pillar number, a second decode threshold number, and a second encoding function;

when the first storage parameters substantially match the second storage parameters:

retrieving metadata of the data object from a first container structure associated with the first container, wherein the metadata includes one or more of: permissions for the data object, DSN addresses of the plurality of sets of encoded data slices, and access control to the data object;

modifying the metadata regarding the transferring of the data object from the first container to the second container to produce modified metadata; and adding the modified metadata to a second container structure associated with the second container such that the data object is accessible via the second container.

2. The method of claim 1 further comprises:

when the transfer is a migration, deleting the metadata of the data object from the first container structure after the modified metadata is added to the second container structure.

3. The method of claim 1 further comprises:

when the transfer is duplication, retaining the metadata of the data object in the first container structure after the modified metadata is added to the second container structure.

4. The method of claim 1, wherein the determination that the first storage parameters substantially match the second storage parameters comprises:

determining that the first pillar number substantially matches the second pillar number;

determining that the first decode threshold number substantially matches the second decode threshold number; and determining that the first encoding function substantially matches the second encoding function.

5. The method of claim 1 further comprises:

when the first storage parameters does not substantially match the second storage parameters, determining whether the first encoding function substantially matches the second encoding function; and when the first encoding function does not substantially match the second encoding function, performing the transferring of the data object by:

retrieving the plurality of sets of encoded data slices from the first container;

decoding the plurality of sets of encoded data slices to obtain the data object;

encoding the data object with the second storage parameters to produce a second plurality of sets of encoded data slices; and storing the second plurality of sets of encoded data slices in the second container.

6. The method of claim 5 further comprises:

when the first encoding function does substantially match the second encoding function, determining whether the first decode threshold number substantially matches the second decode threshold number;

when the first decode threshold number does not substantially match the second decode threshold number, performing the transferring of the data object by:

retrieving the plurality of sets of encoded data slices from the first container;

decoding the plurality of sets of encoded data slices to obtain the data object;

encoding the data object with the second storage parameters to produce the second plurality of sets of encoded data slices; and storing the second plurality of sets of encoded data slices in the second container.

7. The method of claim 6 further comprises:

when the first decode threshold number does substantially match the second decode threshold number and when the first pillar number does not substantially matches the second pillar number, determining whether the first pillar number is greater than the second pillar number; and when the first pillar number is greater than the second pillar number, modifying the metadata to include DSN addresses for a plurality of modified sets of encoded data slices of the plurality of sets of encoded data slices, wherein a modified set of encoded data slices of the plurality of modified sets of encoded data slices includes the second pillar number of encoded data slices.

8. The method of claim 7 further comprises:
when the second pillar number is greater than the first pillar number:
generating, based on the first encoding function, one or more new encoded data slices for each set of the plurality of sets of encoded data slices;
storing the one or more new encoded data slices for each set of the plurality of sets of encoded data slices in the second container; and
modifying the metadata to include DSN addresses for the plurality of sets of encoded data slices and for the one or more new encoded data slices for each set of the plurality of sets of encoded data slices.

9. A computing device of a dispersed storage network (DSN), the computing device comprises:
an interface;
memory; and
a processing module operably coupled to the memory and the interface, wherein the processing module is operable to:
determine to transfer a data object from a first container of a vault to a second container of the vault, wherein a vault is a logical memory structure supported by physical memory of storage units of the DSN, wherein the vault is logically divided into a plurality of containers that includes the first and second containers, wherein the data object is stored in the first container as a plurality of sets of encoded data slices;
determine first and second storage parameters for the first and second containers, respectively, wherein the first storage parameters include a first pillar number, a first decode threshold number, and a first encoding function and the second storage parameters include a second pillar number, a second decode threshold number, and a second encoding function;
when the first storage parameters substantially match the second storage parameters:
retrieve metadata of the data object from a first container structure associated with the first container, wherein the metadata includes one or more of: permissions for the data object, DSN addresses of the plurality of sets of encoded data slices, and access control to the data object;
modify the metadata regarding the transferring of the data object from the first container to the second container to produce modified metadata; and
add the modified metadata to a second container structure associated with the second container such that the data object is accessible via the second container.

10. The computing device of claim 9, wherein the processing module is further operable to:
when the transfer is a migration, delete the metadata of the data object from the first container structure after the modified metadata is added to the second container structure.

11. The computing device of claim 9, wherein the processing module is further operable to:
when the transfer is duplication, retain the metadata of the data object in the first container structure after the modified metadata is added to the second container structure.

12. The computing device of claim 9, wherein the processing module is operable to determine that the first storage parameters substantially match the second storage parameters by:
determining that the first pillar number substantially matches the second pillar number;
determining that the first decode threshold number substantially matches the second decode threshold number; and
determining that the first encoding function substantially matches the second encoding function.

13. The computing device of claim 9, wherein the processing module is further operable to:
when the first storage parameters does not substantially match the second storage parameters, determine whether the first encoding function substantially matches the second encoding function; and
when the first encoding function does not substantially match the second encoding function, perform the transferring of the data object by:
retrieving the plurality of sets of encoded data slices from the first container;
decoding the plurality of sets of encoded data slices to obtain the data object;
encoding the data object with the second storage parameters to produce a second plurality of sets of encoded data slices; and
storing the second plurality of sets of encoded data slices in the second container.

14. The computing device of claim 13, wherein the processing module is further operable to:
when the first encoding function does substantially match the second encoding function, determine whether the first decode threshold number substantially matches the second decode threshold number;
when the first decode threshold number does not substantially match the second decode threshold number, perform the transferring of the data object by:
retrieving the plurality of sets of encoded data slices from the first container;
decoding the plurality of sets of encoded data slices to obtain the data object;
encoding the data object with the second storage parameters to produce the second plurality of sets of encoded data slices; and
storing the second plurality of sets of encoded data slices in the second container.

15. The computing device of claim 14, wherein the processing module is further operable to:
when the first decode threshold number does substantially match the second decode threshold number and when the first pillar number does not substantially matches the second pillar number, determine whether the first pillar number is greater than the second pillar number; and
when the first pillar number is greater than the second pillar number, modify the metadata to include DSN addresses for a plurality of modified sets of encoded data slices of the plurality of sets of encoded data slices, wherein a modified set of encoded data slices of the plurality of modified sets of encoded data slices includes the second pillar number of encoded data slices.

16. The computing device of claim 15, wherein the processing module is further operable to:
when the second pillar number is greater than the first pillar number:
generate, based on the first encoding function, one or more new encoded data slices for each set of the plurality of sets of encoded data slices;
store the one or more new encoded data slices for each set of the plurality of sets of encoded data slices in the second container; and
modify the metadata to include DSN addresses for the plurality of sets of encoded data slices and for the one or more new encoded data slices for each set of the plurality of sets of encoded data slices.

* * * * *